(12) United States Patent
Visentin et al.

(10) Patent No.: US 11,837,907 B2
(45) Date of Patent: Dec. 5, 2023

(54) ENERGY MANAGEMENT SYSTEM AND METHOD OF A ROV

(71) Applicant: SAIPEM S.P.A., San Donato Milanese (IT)

(72) Inventors: Roberto Visentin, San Donato Milanese (IT); Giovanni Massari, San Donato Milanese (IT); Diego Lazzarin, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 338 days.

(21) Appl. No.: 17/418,097

(22) PCT Filed: Dec. 27, 2019

(86) PCT No.: PCT/IB2019/061403
§ 371 (c)(1),
(2) Date: Jun. 24, 2021

(87) PCT Pub. No.: WO2020/136617
PCT Pub. Date: Jul. 2, 2020

(65) Prior Publication Data
US 2022/0069612 A1 Mar. 3, 2022

(30) Foreign Application Priority Data
Dec. 27, 2018 (IT) .................. 102018000021178

(51) Int. Cl.
*H02J 7/34* (2006.01)
*B63G 8/00* (2006.01)
(Continued)

(52) U.S. Cl.
CPC .............. *H02J 7/345* (2013.01); *B60L 50/60* (2019.02); *B60L 53/14* (2019.02); *B60L 53/68* (2019.02);
(Continued)

(58) Field of Classification Search
CPC .. H02J 7/345; H02J 7/00; H02J 7/0013; H02J 2310/42; H02J 7/34; B60L 53/68;
(Continued)

(56) References Cited

U.S. PATENT DOCUMENTS

| 4,686,927 A | 8/1987 | Hawkes et al. |
| 2015/0112513 A1 | 4/2015 | Kerins et al. |

FOREIGN PATENT DOCUMENTS

| WO | WO 01/21479 A1 | 3/2001 |
| WO | WO 2015/164763 A1 | 10/2015 |

OTHER PUBLICATIONS

Notification Concerning Submission, Obtention or Transmittal of Priority Document for International Application No. PCT/IB2019/061403 dated Feb. 27, 2020.
(Continued)

*Primary Examiner* — Robert L Deberadinis
(74) *Attorney, Agent, or Firm* — Neal, Gerber & Eisenberg LLP (57) ABSTRACT

An energy management system of a Remotely Operated Vehicle ("ROV") has a generating unit located in a remote station on a water body and configured to generate a generated electrical power with a first maximum value); a ROV configured to operate in the water body and configured to absorb a second maximum value of an absorbed electrical power greater than the first maximum value; an electrical energy transmission line connected to the generating unit and to the ROV; and an electrical energy storage device located along the transmission line and/or on board the ROV.

16 Claims, 5 Drawing Sheets

(51) Int. Cl.
　　*H02J 7/00*　　　(2006.01)
　　*B60L 53/68*　　 (2019.01)
　　*B60L 50/60*　　 (2019.01)
　　*B60L 53/14*　　 (2019.01)

(52) U.S. Cl.
　　CPC ............ *B63G 8/001* (2013.01); *H02J 7/0013* (2013.01); *B63G 2008/007* (2013.01); *H02J 2310/42* (2020.01)

(58) Field of Classification Search
　　CPC ......... B60L 50/60; B60L 53/14; B63G 8/001; B63G 2008/007; B63G 8/00
　　See application file for complete search history.

(56) References Cited

OTHER PUBLICATIONS

International Search Report and Written Opinion for International Application No. PCT/IB2019/061403 dated Apr. 22, 2020.
Italian Priority Search Report for Italian Application No. IT 20180021178 dated Jul. 19, 2019.
PCT Direct Letter attached to the International Patent Application claiming the priority of patent application No. 102018000021178 dated Dec. 27, 2019.

ENERGY MANAGEMENT SYSTEM AND METHOD OF A ROV

PRIORITY CLAIM

This application is a national stage application of PCT/IB2019/061403, filed on Dec. 27, 2019, which claims the benefit of and priority to Italian Patent Application No. 102018000021178, filed on Dec. 27, 2018, the entire contents of which are each incorporated by reference herein.

TECHNICAL FIELD

The present disclosure concerns an energy management system and method for a ROV.

BACKGROUND

The term ROV, an acronym for a Remotely Operated Vehicle, indicates a wire-guided, remote-controlled submarine, which is piloted from a remote station, which may be located above the ocean's surface (e.g., on an oil platform, ship, or buoy); or ashore (e.g., at a fixed location such as a harbour quay). The ROV comprises a power generating unit and a control unit.

The remote station is connected to the ROV by a transmission line to transmit the energy generated by the energy generating unit in the remote station to the ROV and to exchange data between the control unit and the ROV.

When an ROV operates at medium/high depth, the transmission line comprises an intermediate station; an umbilical connecting the remote station to the intermediate station; and a flexible cable connecting the intermediate station to the ROV.

Generally, the intermediate station is a TMS (Tether Management System), which has the function of managing the flexible cable (tether) and of supporting the ROV in the launch and recovery phases of the ROV. Specifically, the ROV and TMS are coupled to each other during the launch phase and are launched into the water body via a support ship or platform equipped with a launch device (LARS). The umbilical, besides transmitting energy and exchanging signals is, unlike the tether, a cable armed with a load-bearing function and able to support both the ROV and TMS with traction.

ROVs are used to perform a variety of activities in the water body and are available in different sizes and powers. The International Marine Contractors Association (IMCA) composed of operators in the offshore oil & gas and renewable energy sectors has provided a classification of ROVs according to their specialisations.

Inspection ROVs, also called EYEBALL ROVs, are part of Class I and are small and fully electric ROVs that are generally intended for visual and cathodic inspection of platforms and pipes. These ROVs can reach a maximum depth of 300 meters and are able to lift up to 10 kilograms.

Inspection and light work ROVs belong to class II. These ROVs are medium in size, weigh about 500 kilograms for larger tonnages, and can reach a depth of 3,000 meters. They are usually equipped with one or more cameras, navigation sensors to detect and scan the seabed, and hydraulic manipulators used for simple jobs.

Work or work-class ROVs are classified as class III. These ROVs are generally large in size, often have hydraulic actuators, and can reach up to 10,000 meters below sea level.

Excavator ROVs are classified in class IV, are very large, and comprise tracks to advance on the water body bed, sonar system and cameras, and are used to dig trenches in which to bury underwater pipes.

The transmission line must transmit the power necessary for the operation of the ROV. As the transmitted power increases, the weight and stiffness of the transmission line increase, and this may hinder the ROV's movements.

SUMMARY

The purpose of the present disclosure is to provide an energy management system of a ROV that avoids certain of the drawbacks of certain of the prior art.

According to the present disclosure an energy management system of a ROV is provided, the system comprising:
- an electrical energy generating unit located in a remote station on a water body and configured to generate a generated electrical power with a first maximum value;
- a wire-guided ROV configured to operate in the water body and configured to absorb a second maximum value of an absorbed electrical power greater than the first maximum value;
- an electrical energy transmission line connected to the generating unit and to the ROV and configured to transmit electrical power from the generating unit to the ROV; and
- an electrical energy storage device located along the transmission line and/or on board the ROV.

It should be appreciated that in accordance with the present disclosure, the generating unit and the transmission line are configured to generate and to transmit, respectively, a maximum value of electrical power slightly higher, such as between 10% and 20% higher, than the average value of the power absorbed by the ROV calculated during a test phase. This maximum power value is relatively much lower, such as equal to between 10% and 30%, more specifically between 10% and 20%, of the maximum value of the power absorbed by the ROV. As a result, the transmission line is relatively more flexible and facilitates the ROV's movements. In addition, the wire-guided ROV performs relatively better.

It should be further appreciated that in accordance with the present disclosure, there are relatively fewer constraints in the choice of the power of the electrical energy generating unit, the transmission line, and the storage device. This is because the lower electrical power of one can be compensated for by the electrical power of the other and vice versa. Consequently, commercial and large production components can be used to increase relative performance at the same cost.

In accordance with one embodiment of the present disclosure, the electrical energy storage device may be: one or more rechargeable batteries; one or more capacitors, such as super capacitors; or one or more rechargeable batteries and one or more capacitors, such as super capacitors.

Batteries and capacitors are the most suitable storage devices for this type of application. The selection of batteries or capacitors is made based on the amount of energy to be stored and based on the discharge current to be obtained based on the ROV requirements. In certain embodiments, the storage device comprises both capacitors and batteries to optimize the stored power with the discharge rate.

In particular, the storage device is configured to deliver a third maximum value of electrical power that is greater or equal to the difference between the second maximum value of absorbed electrical power and the first maximum value of generated electrical power in order to compensate for the difference between the absorbed power and the generated power. The storage device is configured to store a maximum value of energy that is related to the third maximum value of electrical power.

The selection of the type of storage device is also related to the vehicle usage statistics, which are collected in a test phase before the ROV is put into service. These usage statistics are used to define both the third maximum value of power to be delivered and the maximum value of energy that can be stored in the storage device.

In accordance with one embodiment of the present disclosure, the electrical energy storage device is placed on board the ROV. This solution enables the entire transmission line to be sized depending on the first maximum power value.

In accordance with another embodiment of the present disclosure, the transmission line comprises an intermediate station; an umbilical connected to the generating unit and to the intermediate station; and a flexible cable connected to the intermediate station and to the ROV; wherein the umbilical is configured to transmit an amount of electrical power equal to the first maximum value. In this way, the intermediate station is able to house the storage device and avoids overloading the ROV. In addition and in accordance with certain embodiments of the present disclosure, it is possible to reduce the cost of the umbilical without increasing the weight of the ROV.

The present disclosure takes the form of an embodiment in which the storage device comprises a first storage block placed on board the intermediate station and a second storage block placed on board the ROV. In particular, the first storage block comprises one or more rechargeable batteries and the second storage block comprises batteries and/or one or more capacitors, in particular super capacitors. In this way, the weight of the storage device is distributed between the intermediate station and the ROV. In addition and in accordance with certain embodiments of the present disclosure, a high discharge rate of the storage device supplied by the capacitors and a high energy density supplied by the batteries are obtained.

According to the present disclosure, the first maximum value is equal to the average value calculated over a selected time interval between 5 and 60 minutes of the absorbed electrical power depending on statistical data and the type of use. In this way, the power selection is made in order to optimise the overall weight/performance ratio of the system, more specifically of the transmission unit, the storage device, and the transmission line, also taking costs into account.

More specifically, the energy storage device is modular and is configured so that the number of batteries and/or capacitors can be varied depending on the intended use of the ROV. In this way, it is relatively simple to configure the ROV and/or the intermediate station to house the modular storage device.

In particular, the system comprises an electrical power management device connected to the storage device and the generating unit; the power management device being configured to selectively supply the ROV, depending on a command signal received from a control unit and related to the request for instantaneous absorbed electrical power from the ROV in a first operating mode, according to which the generating unit supplies both the ROV and the storage device; and in a second operating mode, according to which the generating unit and the storage device simultaneously supply energy to the ROV. In this way, the selection of the operating mode is performed automatically by the control unit depending on the power required by the ROV. In more detail, the electrical power management device at any given time uses the electrical power generated by the generating unit to supply the ROV. In addition, when the electrical power absorbed by the ROV is greater than the first maximum value of generated electrical power, electrical power from the storage device is supplied to the ROV. When, instead, the electrical power absorbed by the ROV is less than the first maximum value of generated electrical power, including when the electrical power absorbed by the ROV is zero, the management device supplies power to the storage device in order to store energy. In this way, the generating unit almost always works at maximum power; in other words, the generated electrical power is almost always equal to the first maximum value.

Another purpose of the present disclosure is to provide an energy management system of a ROV that avoids certain of the drawbacks of certain of the prior art.

In accordance with the present disclosure, an energy management system of an ROV is provided, the method comprising the following phases:

generating electrical power through an electrical energy generating unit having a first maximum value of generated electrical power and located in a remote station on a water body;

absorbing through the ROV a second maximum value of absorbed electrical power, wherein the first maximum value is lower than the second maximum value;

transmitting electrical energy from the generating unit to the ROV via an electrical energy transmission line; and accumulating or delivering electrical energy through an electrical energy storage device located along the transmission line and/or on board the ROV in order to compensate for the difference between the absorbed electrical power and the generated electrical power.

Such a method provides that the flexibility of the transmission line can be relatively optimised to increase the relative performance and operation of the ROV.

BRIEF DESCRIPTION OF THE FIGURES

Further features and advantages of the present disclosure will become clear from the following description of a non-limiting embodiment thereof, with reference to the figures of the attached drawings, wherein.

DETAILED DESCRIPTION

Figure 1:
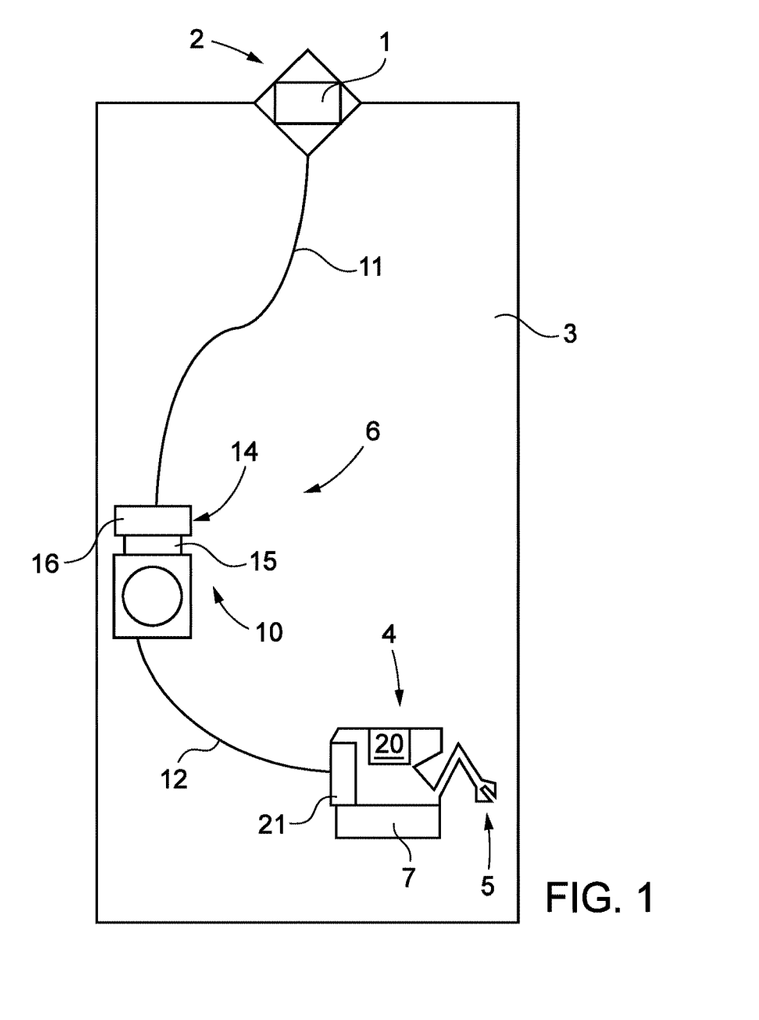
FIG. 1 is a schematic view of an electrical energy management system of a ROV produced according to a first embodiment of the present disclosure.
Figure 4:
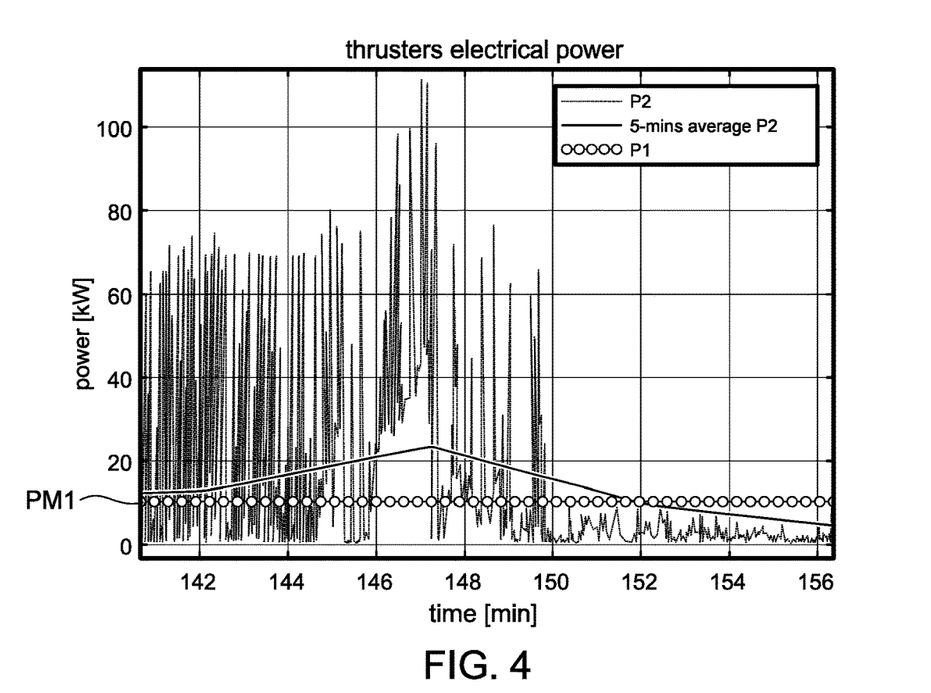
FIG. 4 is a graph showing the absorbed electrical power P2, the generated electrical power P1, and the average value of the absorbed electrical power P2.
Figure 6:
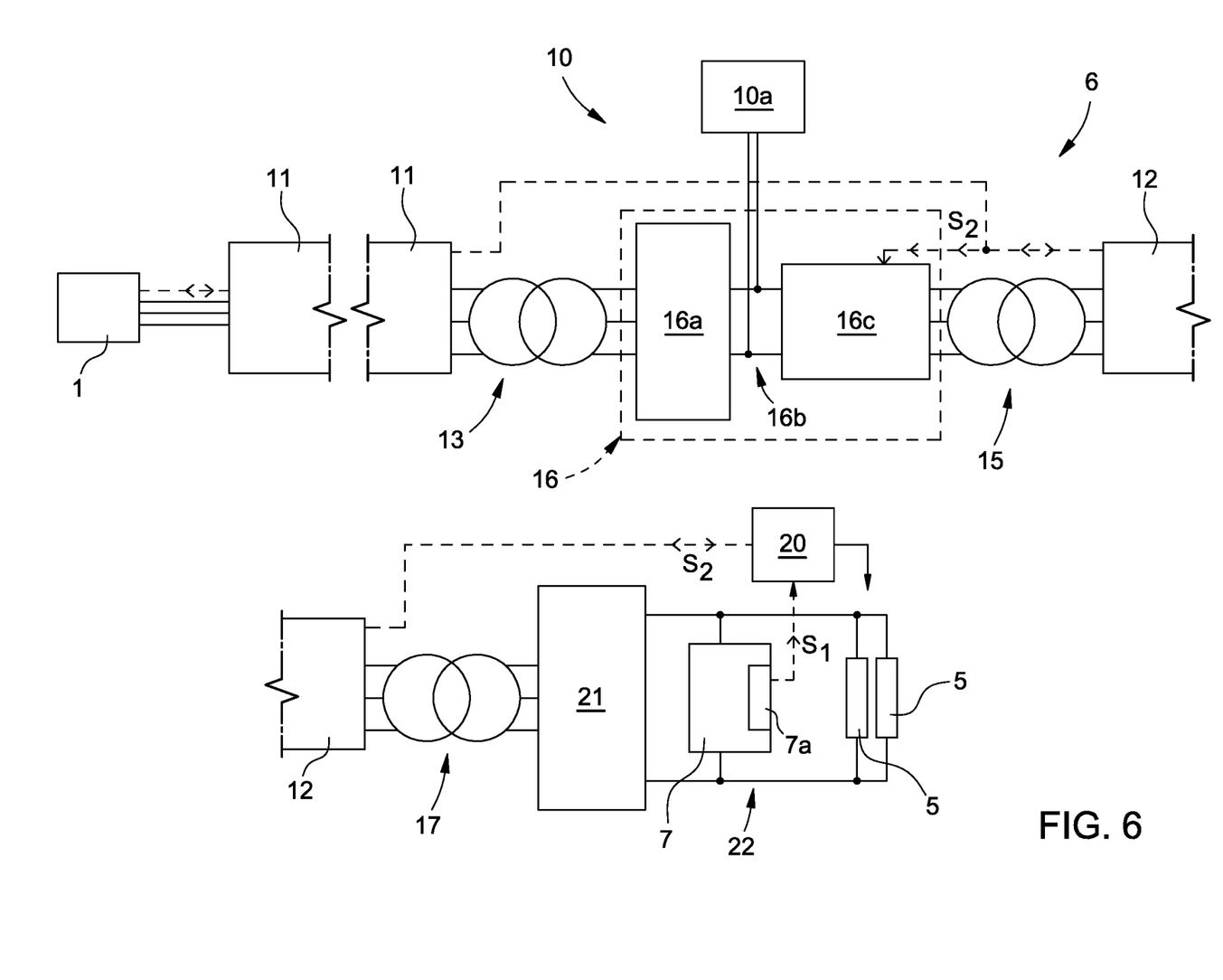
FIG. 6 is a block diagram of the electrical energy management system of a ROV in FIG. 1.

With reference to FIGS. 1, 4, and 6, an electrical energy management system of a wire-guided ROV is shown, the system comprising an electrical energy generating unit 1 configured to generate a maximum value PM1 of generated electrical power P1 and located in a remote station 2 on a water body 3; a wire-guided ROV 4 configured to operate in the water body 3 and equipped with a plurality of users 5, the ROV 4 is configured to absorb a maximum value PM2 of absorbed electrical power P2, wherein the maximum value PM2 of absorbed electrical power P2 is greater than the maximum value PM1 of electrical power generated P1 by the generating unit 1; an electrical energy transmission line 6 connecting the generating unit 1 to the ROV 4; and an electrical energy storage device 7. The storage device 7 is configured to store energy when the absorbed electrical power P2 is less than the maximum value PM1 of electrical power generated P1 by the generating unit 1 and to deliver energy when the absorbed electrical power P2 is greater than the maximum value PM1 of generated electrical power P1.

The storage device 7 is configured to deliver a third maximum value PM3 of electrical power that is the difference between the second maximum value PM2 and the first maximum value PM1.

The plurality of users 5 of the ROV 4 comprise any ROV 4 device that must be supplied by electrical energy (e.g., the motorised propellers used to move the ROV 4 in the water body) or the various tools that the ROV 4 is equipped with. It is specified that throughout the document, the phrase "maximum value of generated electrical power", or "maximum value of absorbed electrical power", means the maximum electrical power, or peak electrical power detected, produced or recorded even for relatively very short time intervals, such as time intervals from less than 1 second to 1 minute, in other words the maximum instantaneous electrical power.

The remote station 2 can be a naval vehicle, a surface buoy, a platform, or even dry land (for example a pier or the like).

The transmission line 6 comprises: an intermediate station 10; an umbilical 11 connecting the generating unit 1 to the intermediate station 10; and a flexible cable 12 connecting the intermediate station 10 to the ROV 4. In more detail, the umbilical 11 is configured to transmit an amount of electrical power equal to the maximum value PM1. In more detail, the umbilical 11 is an armoured cable with a load-bearing function that is capable of supporting both the ROV 4 and the intermediate station 10 with traction.

The storage device 7 comprises one or more rechargeable batteries, more specifically fast charge and discharge batteries; or one or more capacitors, more specifically super capacitors; or a combination of one or more rechargeable batteries and one or more capacitors. The storage device 7 comprises a control system 7a connected to the battery cells or capacitors and configured to define a charge signal S1 that defines the amount of residual electrical charge contained in the storage device 7 at any given time. In certain embodiments, the storage device 7 is connected in parallel to one or more of the multiple users 5 of the ROV 4.

In addition, the management system comprises an electrical energy management device 14, which, in certain embodiments, is placed at the intermediate station 10, and connected to the umbilical 11 and to the flexible cable 12.

In the embodiment shown in FIGS. 1 and 6 (which does not limit the present disclosure), the storage device 7 is placed on board the ROV 4. In this embodiment, the management device 14 is configured to be supplied by the umbilical 11, and to supply the flexible cable 12 with the generated electrical power P1, more specifically with the maximum value PM1 of generated electrical power P1. In a non-limiting embodiment of the present disclosure, the management device 14 supplies the flexible cable 12 continuously and at all times.

In certain embodiments of the present disclosure, the management device 14 comprises an electrical energy converter device 16 that has the function of converting the electrical energy coming from the umbilical 11 and supplying it to the flexible cable 12. In more detail, in certain non-limiting embodiments of the present disclosure, the converter device 16 receives an alternating current from the umbilical 11 and transforms it into a direct current with which it supplies any users 10a on the intermediate station 10 and re-transforms it back into alternating current to supply it to the flexible cable 12. In this embodiment, the converter device 16 comprises a converting unit 16a configured to convert alternating current to direct current; a direct current power line 16b and a converting unit 16c configured to convert direct current to alternating current. The converting unit 16a is a three-phase rectifier (e.g., a diode rectifier), or an inverter that acts as a rectifier. The converting unit 16c is a three-phase inverter. In addition, in certain non-limiting embodiments of the present disclosure, the management device 14 comprises a voltage transformer 15 between the direct current to alternating current converting unit 16c and the flexible cable 12 configured to increase the voltage and decrease the current transmitted along the flexible cable 12. In addition, in certain non-limiting embodiments of the present disclosure, the management device 14 comprises another current transformer 13 placed between the umbilical 11 and the converting unit 16a configured to convert alternating current to direct current in order to lower the value of the alternating voltage received by the umbilical 11.

The intermediate station 10 comprises one or more electrical users 10a that are connected to the power line 16b to be supplied. In an alternative embodiment, one or more users 10a are supplied by the alternating current drawn downstream of the transformer 13 or upstream of the transformer 15.

With reference to FIG. 6, the management system comprises a control unit 20, (such as, but not necessarily, housed on the ROV 4), and coupled in communication to the management device 14, the storage device 7, and the electrical energy generating unit 1. In addition, the control unit 20 detects the consumption of the ROV's users 5 and calculates the absorbed electrical power P2 at all times.

The ROV 4 comprises a converting unit 21 configured to convert alternating current into direct current that receives alternating current from the flexible cable 20 and transforms it into direct current to supply the users 5 via a direct current power line 22. The converting unit 21 is a three-phase rectifier (e.g., a diode rectifier), or an inverter that acts as a rectifier.

In addition, in a non-limiting embodiment of the present disclosure, the ROV 4 comprises a voltage transformer 17 placed downstream of the flexible cable 12 and upstream of the converting unit 21 to lower the electrical voltage of the flexible cable 12.

The management device 14 is connected to the generating unit 1 via the umbilical 11 and receives, via the umbilical 11, the generated electrical power P1; more specifically, it receives the maximum value PM1 of generated electrical power P1 during most of the operating time.

In more detail, the control unit 20 is coupled in communication to the storage device 7 to receive the charge signal S1 from the storage device 7, which is related to the residual charge in the storage device 7, and to define a command signal S2 to be sent to the management device 14 based on the charge signal S1 received and on the power absorbed by the users 5. In particular, the management device 14 is configured to control the converter device 16, more specifically, the converting unit 16c based on the command signal S2 received, which, in turn, depends on the charge signal S1 and on the power required by the users 5.

As a result, the management device 14 controls the converter device 16, more specifically, the converting unit 16c based on a signal that is defined by the charge signal S1 of the storage device 7.

In certain embodiments, the control unit 20 is configured to request, via the signal S2, the generating unit 1 and the management device 14 to supply the ROV 4 with a power equal to the maximum value PM1. Only if the power absorbed P2 by the ROV 4 is less than the maximum value PM1, and the storage device 7 is fully charged, the control unit 20 does not request, via the command signal S2, a power equal to the maximum value PM1 from the generating unit 1 and from the management device 14, but a power equal to the absorbed power P2.

In addition, the control unit 20 is configured to request a variable supply voltage from the converter device 16, more specifically from the inverter 16c, based on the command signal S2. In these embodiments, the control unit 20, via the command signal S2, defines the power that the converter device 16 must supply to the ROV 4 and the voltage that it must supply. In other words, the power generated P1 by the generating unit 1 is controlled by the control unit 20 and normally equals the maximum value PM1. The power passing through the flexible cable 12 is regulated by the control unit 20 and is normally equal to the maximum power that can be transmitted in the flexible cable 12, which is usually equal to the maximum value PM1. Only if the storage device 7 is fully charged and the absorbed electrical power P2 is less than the maximum value PM1 of generated electrical power P1, then the power passing through the flexible cable 12 is less than the maximum value PM1 and is equal to the absorbed electrical power P2.

In certain embodiments, the flexible cable 12 is connected to the ROV 4 so that it cannot be disconnected in order to supply the ROV 4 with the generated electrical power P1, more specifically with the maximum value PM1 of generated electrical power P1.

In use, the ROV's electrical energy management system is configured to operate in either a first or a second operating mode based on the maximum value PM1 of generated electrical power P1 and on the absorbed electrical power P2. In more detail, if the maximum value PM1 of generated electrical power P1 is greater than the absorbed electrical power P2, the ROV's energy management system operates in the first operating mode; if the absorbed electrical power P2 is greater than the maximum value PM1 of generated electrical power P1, the ROV's energy management system operates in the second operating mode.

In more detail, the management system, when operating in the first operating mode, supplies both the ROV 4, in particular the plurality of users 5, and the storage device 7, in particular, it supplies energy to the storage device 7 so that the storage device stores the supplied energy. In this embodiment, the management device 14 receives electrical power from the umbilical 11 equal to the maximum value PM1 of generated electrical power P1, is controlled by the control unit 20 via the signal S2, and delivers this maximum value PM1 of generated electrical power P1 along the flexible cable 12 to the storage device 7 and to the ROV 4. A portion of the maximum power value PM1 equal to the absorbed electrical power P2 is supplied to the ROV 4, more specifically to the plurality of users 5 of the ROV 4, and the remaining portion equal to the difference between the maximum value PM1 of generated electrical power P1 and the absorbed electrical power P2 shall be stored in the storage device 7.

In the second operating mode, on the other hand, when the maximum value PM1 is less than the electrical power P2 absorbed by the ROV 4, the ROV 4 is supplied simultaneously with the sum of the energy supplied by the storage device 7 and the energy of the electrical energy generating unit 1 and with electrical power equal to the absorbed electrical power P2 that is the sum of the maximum value PM1 of the generated electrical power P1, supplied by the electrical energy generating unit 1, and a quantity of electrical power supplied by the storage device 7. In this embodiment, the umbilical 11 and the flexible cable 12 are configured to transmit electrical power equal to the maximum value PM1 of the generated electrical power P1.

Figure 7:
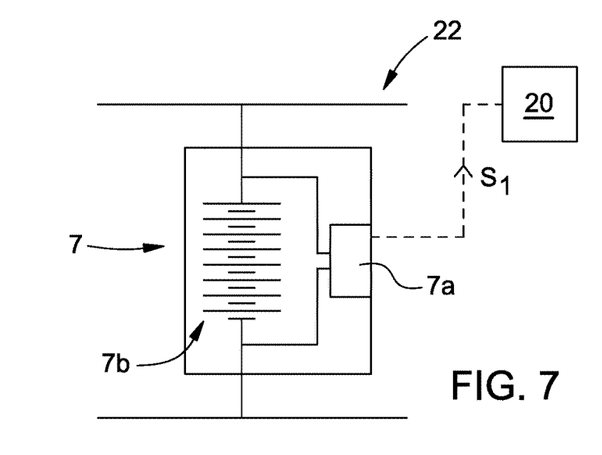
FIG. 7 is a block diagram of an embodiment of a storage device for the electrical energy management system in FIG. 1.

As shown above, the storage device 7, in an embodiment shown in FIG. 7, comprises one or more storage batteries 7b and the control unit 7a is connected to one or more storage batteries 7b cells. In this embodiment, one or more storage batteries 7b are connected directly to a direct current power line, more specifically the power line 22 connecting the users 5 of the ROV 4 to the converting unit 21. In particular, the storage battery pack 7b and one or more users 5 are connected in parallel.

Figure 8:
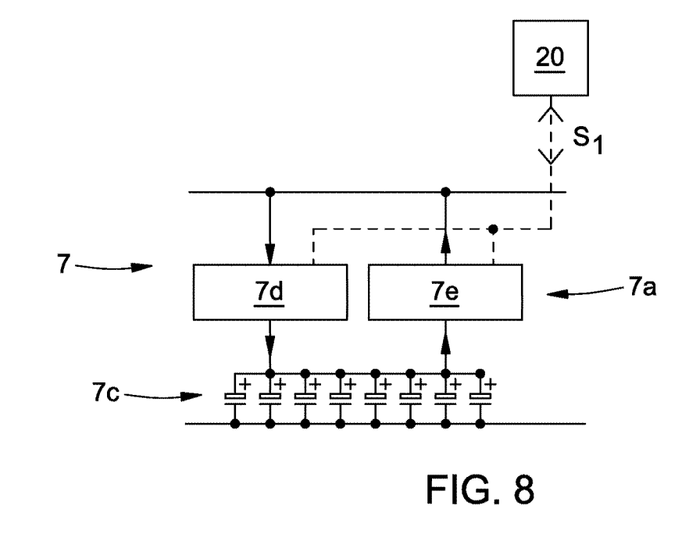
FIG. 8 is a block diagram of another embodiment of a storage device for the electrical energy management system in FIG. 1.

In an alternative embodiment shown in FIG. 8, the storage device 7 comprises one or more capacitors 7c and the control unit 7a comprises a charge circuit 7d and a discharge circuit 7e, one or more capacitors 7c are connected to a direct current power line, in particular the power line 22, via the charge circuit 7d and the discharge circuit 7e. The charge circuit 7d and the discharge circuit 7e are connected to the control unit 20 and provide the signal S1. In addition, the control unit 20 supplies a drive signal to the charge circuit 7d or to the discharge circuit 7e to operate either one or the other. The drive signal is defined by the control unit 20 based on the absorbed electrical power P2. More specifically, and in certain non-limiting embodiments of the present disclosure, if the absorbed electrical power P2 is greater than the maximum value PM1, the control unit 20 sends a drive signal to the discharge circuit 7e, and if the absorbed electrical power P2 is less than the maximum value PM1, the control unit 20 sends a drive signal to the charge circuit 7d.

Figure 9:
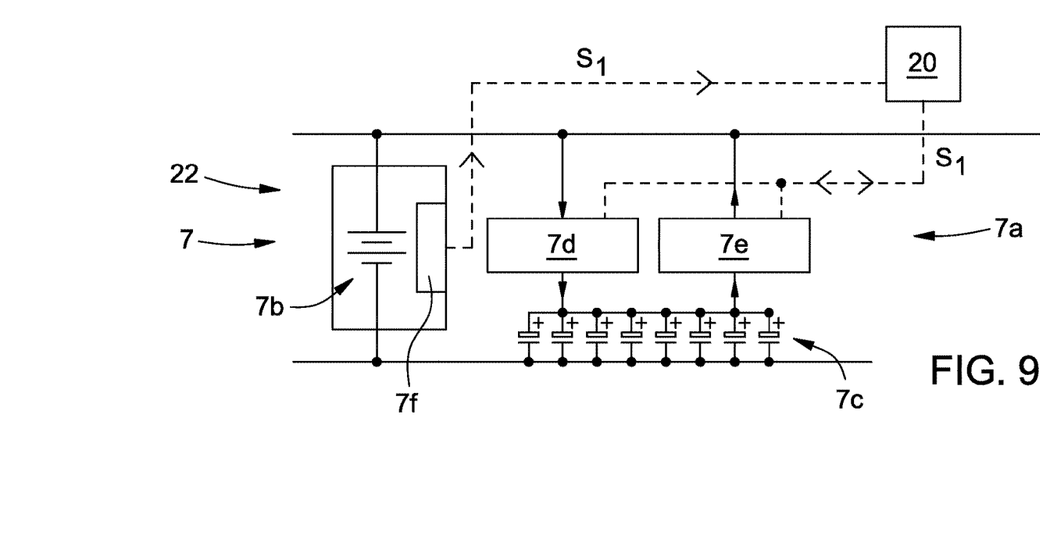
FIG. 9 is a block diagram of another embodiment of a storage device for the electrical energy management system in FIG. 1.

In an embodiment shown in FIG. 9, the storage device 7 comprises one or more rechargeable batteries 7b and one or more capacitors 7c. In this embodiment, the control unit 7a is coupled in communication with the control unit 20 and comprises a control block 7f to control the batteries 7b; a charge circuit 7d for capacitors 7c; and a discharge circuit 7e for capacitors 7c. The batteries 7b are connected directly to a direct current power line; more specifically, the power line 22 and the capacitors 7c are connected to said direct current power line, more specifically, the power line 22, via the charge circuit 7*d* and the discharge circuit 7*e*.

Figure 2:
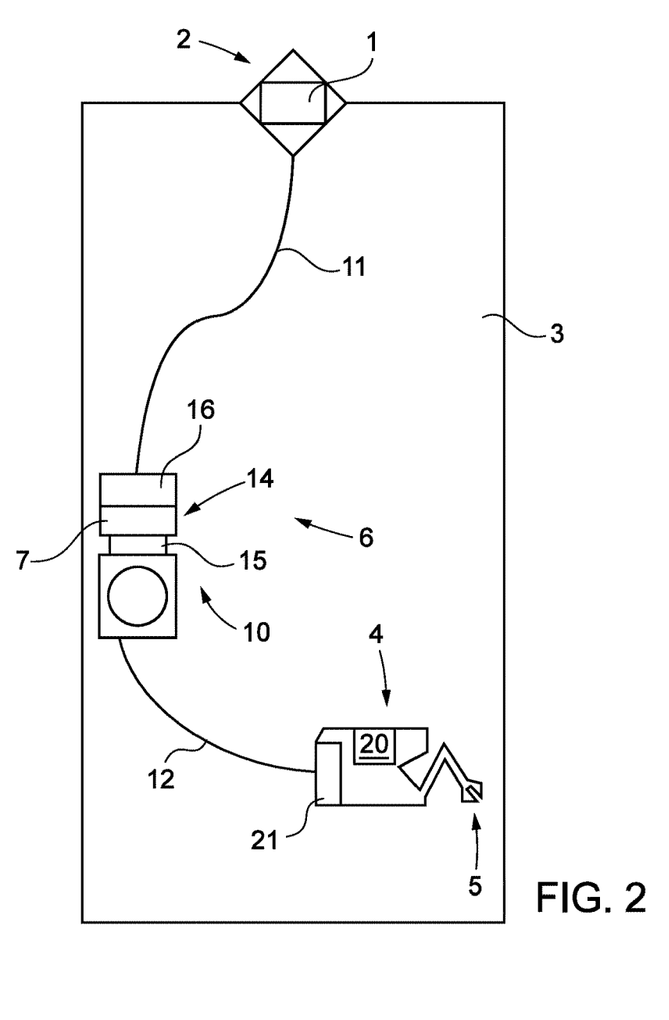
FIG. 2 is a schematic view of an electrical energy management system of a ROV produced according to a second embodiment of the present disclosure.

In an alternative embodiment and with reference to FIG. 2, the storage device 7 is not housed on the ROV 4, as in the embodiment in FIG. 1. In the embodiment in FIG. 2, the storage device 7 is housed on the intermediate station 10. The other parts that are the same across the two embodiments have the same reference numbers. More specifically, the storage device 7 comprises one or more rechargeable batteries, more specifically fast charge and discharge batteries, as in the embodiment shown in FIG. 7, or one or more capacitors, more specifically super capacitors, as in the embodiment shown in FIG. 8, or a combination of one or more rechargeable batteries and one or more capacitors as in the embodiment shown in FIG. 9. In the embodiment in FIG. 2, the storage device 7 is connected to the direct current power line 16*b* of the converter device 16, instead of to the direct current power line 22.

In certain embodiments, the storage device 7 placed on board the intermediate station 10 comprises one or more rechargeable batteries, in particular fast charge and discharge batteries.

The management device 14 is connected to the storage device 7 housed on the intermediate station 10 and is configured to supply the ROV 4 through the flexible cable 12. The flexible cable 12 is always connected to the ROV 4 and, in certain embodiments, is configured to supply the ROV 4 in a continuous and uninterrupted manner.

In this embodiment, the flexible cable 12 is configured to transmit electrical power equal to the maximum value PM2. In the embodiment in FIG. 2, the electrical power transmitted by the flexible cable 12 may be greater than the generated power P1 transmitted by the umbilical 11 because it is the sum of the generated power P1, which is usually equal to the maximum value PM1, with the power delivered by the storage device 7.

The control unit 20 controls the generating unit 1, the storage device 7, and the management device 14, in particular the converter device 16, so that the electrical power supplied through the umbilical 11 is equal to the maximum value PM1, unless the ROV 4 requires electrical power lower than the maximum value PM1 and the signal S1 indicates that the storage device 7 is fully charged. In this case, the electrical power generated P1 by the generating unit 1 will be equal to the value of the absorbed electrical power P2 and the power through the umbilical 11 will be equal to the absorbed electrical power P2.

In use, if the maximum value PM1 of generated electrical power P1 is greater than the absorbed electrical power P2, the management system operates in the first operating mode; if the absorbed electrical power P2 is greater than the maximum value PM1 of generated electrical power P1, the management system operates in the second operating mode. In particular, the management device 14, which is controlled by the control unit 20, operates in either the first operating mode or in the second operating mode.

In more detail, the management system, and in particular the management device 14 when operating in the first operating mode, is configured to supply: the ROV 4, more specifically its plurality of users 5, through the flexible cable 12; and the storage device 7, more specifically to supply energy to the storage device 7 so that the storage device stores the supplied energy. In this embodiment, the management device 14 receives electrical power from the umbilical 11 equal to the maximum value PM1 of generated electrical power P1 and delivers electrical power equal to the absorbed electrical power P2 to the ROV 4 and, in particular, to the multiple users 5 of the ROV 4. In addition, the management device 14 delivers electrical power equal to the difference between the maximum value PM1 of generated electrical power and the absorbed electrical power P2 that is greater than zero to the storage device 7.

The management system and, more specifically the management device 14 when operating in the second operating mode, is configured to: receive energy from the storage device 7; and to continuously supply the ROV 4 with energy from the storage device 7 and with the energy from the generating unit 1 with electrical power value equal to the absorbed electrical power P2, supplied through the flexible cable 12, which is the sum of electrical power coming from the energy of the storage device 7 and the generated electrical power P1, more specifically the maximum value PM1 of the generated electrical power P1 supplied by the generating unit 1 and transferred along the umbilical 11. In this embodiment, the umbilical 11 is configured to transmit the maximum value PM1 of generated electrical power P1 while the flexible cable 12 is configured to transmit the maximum value PM2 of absorbed electrical power P2 that is greater than the maximum value PM1.

Figure 3:
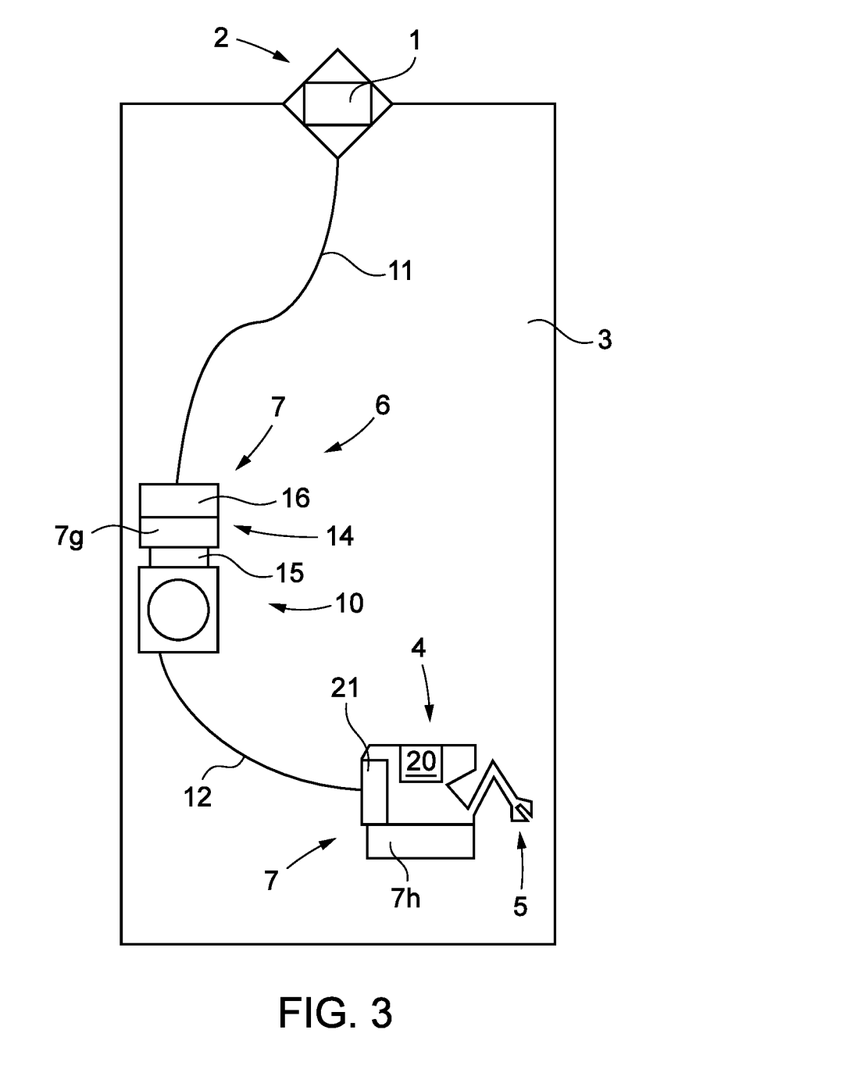
FIG. 3 is a schematic view of an electrical energy management system of a ROV produced according to a third embodiment of the present disclosure.

In an alternative embodiment and with reference to FIG. 3, the energy storage device 7 is housed on both the ROV 4 and the intermediate station 10. In more detail, the storage device 7 comprises a power storage block 7*g* of energy placed on the intermediate station 10 and a power storage block 7*h* of energy placed on the ROV 4. In particular in certain non-limiting embodiments, the storage block 7*g* comprises one or more rechargeable batteries 7*b*, more specifically fast charge and discharge batteries, as in the embodiment in FIG. 7, and the storage block 7*h* comprises one or more rechargeable batteries 7*b*, more specifically fast charge and discharge batteries, and/or one or more capacitors 7*c*, more specifically super capacitors, like one of the embodiments shown in FIGS. 7 to 9.

The other parts equal to the embodiment in FIG. 1 are shown with the same reference number.

The management device 14 is connected to the umbilical 11 to be supplied by the umbilical 11 and to the flexible cable 12 to provide uninterrupted energy to the flexible cable 12. The converting unit 21 is connected to the flexible cable 12 to receive electrical power from the flexible cable 12 and to supply it to the storage block 7*h* and to the ROV 4.

In certain embodiments, the flexible cable 12 is connected to the ROV 4 so that it cannot be disconnected in order to supply the ROV 4 with uninterrupted power.

In certain embodiments, the intermediate station 10 is connected so that it cannot be disconnected to the flexible cable 12 to supply the flexible cable 12 and, thus, the ROV 4 with electrical power.

The control unit 20 receives a residual charge signal S1 from the storage block 7*h* and controls the management device 14 via a command signal S2 defined based on the signal S1 and the absorbed electrical power P2, in particular it controls the converting unit 16*c* via the command signal S2, in order to deliver energy to the storage block 7*h* and to the ROV 4 equal to the maximum power that can be transmitted to the flexible cable 12. In use, the management device 14 receives the generated electrical power P1 from the generating unit 1, which is usually equal to the maximum value PM1. The management device 14 is controlled by the control unit 20 in order to deliver an electrical power equal to the maximum power that can be transmitted along the flexible cable 12, unless the storage block 7*h* is fully charged and the electrical power absorbed P2 by the users 5 is lower than the maximum value PM1.

In addition, in certain embodiments, the ROV 4 is connected so that it cannot be disconnected to the intermediate station 10 to be continuously supplied.

In this embodiment, the umbilical 11 is configured to transmit the maximum value PM1, while the flexible cable 12 is configured to transmit a fourth maximum electrical power value that is greater than the maximum value PM1 and less than the maximum value PM2 of absorbed electrical power P2. The difference in power between the maximum value PM2 and the fourth maximum value is supplied by the electrical power that supplies the storage block 7*h*.

Figure 5:
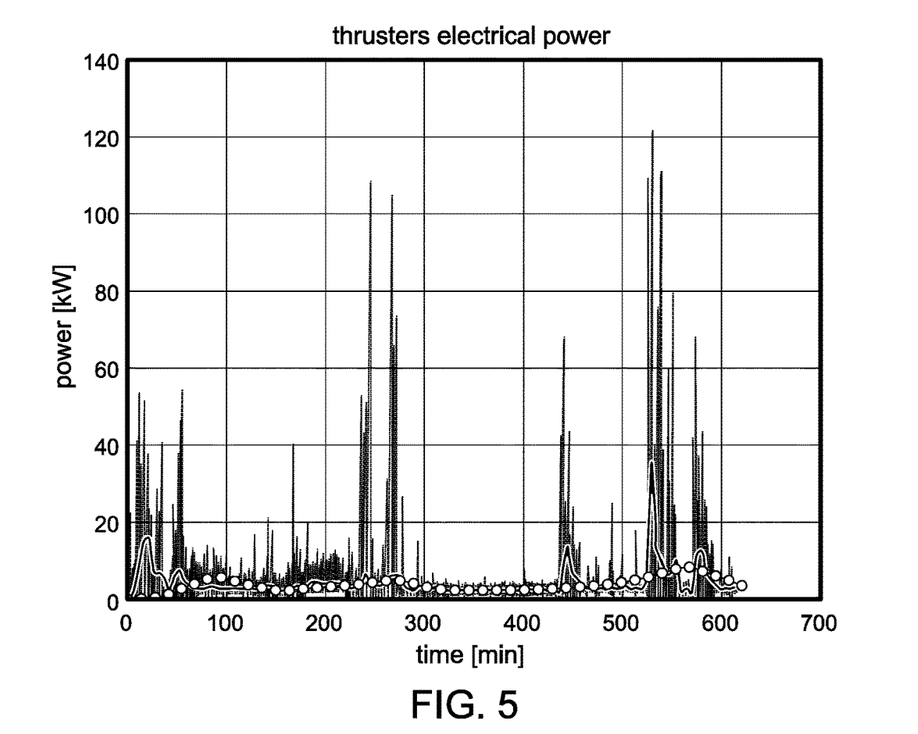
FIG. 5 is a graph showing a statistical analysis of the electrical power consumption of a ROV.

In addition, in all embodiments, the generating unit 1 has been configured so that the maximum value PM1 of the generated electrical power P1 is equal to an electrical power calculated based on the average value of the estimated electrical power absorbed P2 by the ROV 4 calculated over a time interval that can be taken over a selected time interval between 5 and 60 minutes depending on the embodiment. The estimated absorbed electrical power is calculated using statistical data and based on the type of use. In other words, during the design phase, the maximum value PM1 of the generated electrical power P1 of the generating unit 1 is configured and defined based on a statistical study carried out in a test phase that gives a graph of the electrical power absorption of an ROV shown in FIG. 5. In more detail, FIG. 5 shows a graph of electrical power absorption of a ROV made during a test phase in a standard use for ROVs belonging to classes II to III. Based on the analyses of a plurality of graphs of the electrical power absorbed P2 by the ROV 4 of the above type, it was concluded that, in practice, the ROVs 4 use the maximum electrical power only for relatively short fractions of time, while the average absorbed electrical power is significantly lower by 10%-30% compared to the peak value. According to the time considered for the average, the peak electrical power required by the ROV, including for relatively very short times of the order of a few seconds, can be up to 10 times greater than the average electrical power in an hour of operations. The electrical power absorbed by a ROV belonging to classes I to III is mainly due to the motorised propellers (thrusters) that are used to move the ROVs in the water body and the peaks of electrical power absorption are reached during the starting phase and during particular manoeuvres. These observations on static data therefore enable a ratio of maximum values to be defined between the maximum value PM2 of electrical power absorbed P2 by the ROV 4 and the maximum value PM1 of electrical power generated P1 by the energy generating unit 1. The ratio is calculated based on the data acquired and may be increased by a safety coefficient. The storage device 7 is sized based on the ratio of maximum values.

Furthermore, it should be appreciated that in different embodiments, the energy storage device 7 is modular and is configured so that the number of batteries and/or capacitors can be increased or decreased in order to increase or decrease the energy storage capacity, even after the first use and according to different uses during the life of the system. In more detail, the storage device 7 is equipped with a plurality of connectors so that a variable number of batteries and/or capacitors can be connected to the storage device.

The present disclosure extends to additional variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A remotely operated vehicle energy management system comprising:
   an electrical power generation unit locatable in a remote station on a body of water, the electrical power generation unit configured to generate electrical power with a first maximum value;
   a wire-guided remotely operated vehicle configured to operate in the body of water and absorb a second maximum value of electrical power that is greater than the first maximum value;
   an electrical energy transmission line connectable to the electrical power generation unit and to the remotely operated vehicle, the electrical energy transmission line configured to transmit electrical energy from the electrical power generation unit to the remotely operated vehicle; and
   an electrical energy storage device locatable at at least one of: along the electrical energy transmission line and on the remotely operated vehicle.

2. The remotely operated vehicle energy management system of claim 1, wherein the electrical energy storage device comprises at least one of: at least one rechargeable battery, at least one capacitor, and a combination of at least one rechargeable battery and at least one capacitor.

3. The remotely operated vehicle energy management system of claim 1, wherein the electrical energy storage device is configured to deliver a third maximum value of electrical power to compensate for a difference between the absorbed electrical power and the generated electrical power, the third maximum value of electrical power equal to a difference between the second maximum value and the first maximum value.

4. The remotely operated vehicle energy management system of claim 1, wherein the electrical energy storage device is locatable on the remotely operated vehicle and another electrical energy storage device is locatable along the electrical energy transmission line.

5. The remotely operated vehicle energy management system of claim 1, wherein the electrical energy transmission line comprises:
   an intermediate station,
   an umbilical connectable to the electrical power generation unit and the intermediate station, the umbilical configured to transmit an amount of electrical power equal to the first maximum value; and
   a flexible cable connectable to the intermediate station and to the remotely operated vehicle.

6. The remotely operated vehicle energy management system of claim 5, wherein the electrical energy storage device is locatable at the intermediate station.

7. The remotely operated vehicle energy management system of claim 6, wherein the electrical energy storage device comprises:
   a first storage block locatable at the intermediate station, and
   a second storage block locatable on the remotely operated vehicle.

8. The remotely operated vehicle energy management system of claim 7, wherein the first storage block comprises at least one rechargeable battery, and the second storage block comprises at least one of: at least one rechargeable battery and at least one capacitor.

9. The remotely operated vehicle energy management system of claim 1, wherein the first maximum value is equal to an average value calculated over a time interval value between 5 minutes and 60 minutes of absorbed electrical power, the time interval selectable based on a type of use of the remotely operated vehicle.

10. The remotely operated vehicle energy management system of claim 1, wherein the energy storage device is modular and configured to operate, based on a use of the remotely operated vehicle, with a variable quantity of at least one of batteries and capacitors.

11. The remotely operated vehicle energy management system of claim 1, further comprising an electrical energy management device connectable to the electrical energy storage device and the electrical power generation unit, the electrical energy management device configured to selectively supply the remotely operated vehicle based on a command signal received from a control unit, the command signal being related to a request for absorbed electrical power from the remotely operated vehicle in at least one of: a first operating mode in which the electrical power generation unit simultaneously supplies both the remotely operated vehicle and the electrical energy storage device, and a second operating mode in which the electrical power generation unit and the electrical energy storage device simultaneously supply electrical power to the remotely operated vehicle.

12. A method of managing energy of a remotely operated vehicle, the method comprising:
    generating electrical power through an electrical power generation unit having a first maximum value of generated electrical power, the electrical power generation unit being located at a remote station on a body of water;
    absorbing, through the remotely operated vehicle in the body of water, a second maximum value of electrical power, the second maximum value being greater than the first maximum value;
    transmitting, via an electrical energy transmission line, electrical energy from the electrical power generation unit to the remotely operated vehicle;
    responsive to a first difference between the absorbed electrical power and the generated electrical power, accumulating electrical energy by an electrical energy storage device located along at least one of the electrical energy transmission line and on the remotely operated vehicle; and
    responsive to a second difference between the absorbed electrical power and the generated electrical power, delivering, via the electrical energy storage device, electrical energy to the remotely operated vehicle.

13. The method of claim 12, further comprising the electrical energy storage device delivering a third maximum value of electrical power equal to a difference between the second maximum value and the first maximum value to compensate for a difference between the absorbed power and the generated power.

14. The method of claim 12, further comprising configuring the first maximum value of the electrical power generation unit to equal an average value calculated over a time interval between 5 minutes and 60 minutes of the electrical power absorbed by the remotely operated vehicle, the time interval selected based on a type of use of the remotely operated vehicle.

15. The method of claim 12, wherein the electrical energy storage device is modular and further comprising varying at least one of a quantity of batteries and a quantity of capacitors based on a use of the remotely operated vehicle.

16. The method of claim 12, further comprising selectively supplying the remotely operated vehicle with a command signal received from a control unit, the command signal being related to an absorbed electric power request from the remotely operated vehicle in one of: a first operating mode in which the electrical power generation unit simultaneously delivers electrical power to both the remotely operated vehicle and the electrical energy storage device, and a second operating mode in which the electrical power generation unit and the electrical energy storage device simultaneously deliver power to the remotely operated vehicle.

* * * * *